US009241110B2

(12) United States Patent
Ishii et al.

(10) Patent No.: US 9,241,110 B2
(45) Date of Patent: Jan. 19, 2016

(54) INFORMATION DISPLAY DEVICE AND INFORMATION DEVICE SYSTEM

(71) Applicant: YOKOGAWA ELECTRIC CORPORATION, Musashino-shi, Tokyo (JP)

(72) Inventors: Yousuke Ishii, Tokyo (JP); Kenji Oishi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 13/894,829

(22) Filed: May 15, 2013

(65) Prior Publication Data
US 2013/0308016 A1 Nov. 21, 2013

(30) Foreign Application Priority Data

May 18, 2012 (JP) ................................. 2012-114454

(51) Int. Cl.
H04N 5/262 (2006.01)
H04N 5/232 (2006.01)
G06F 3/0488 (2013.01)
G06F 3/0484 (2013.01)

(52) U.S. Cl.
CPC ............ H04N 5/2621 (2013.01); G06F 3/0488 (2013.01); G06F 3/04847 (2013.01); H04N 5/232 (2013.01)

(58) Field of Classification Search
USPC ........................................................ 348/239
See application file for complete search history.

(56) References Cited

U.S. PATENT DOCUMENTS

2009/0009626 A1* 1/2009 Ko et al. ..................... 348/231.3
2011/0134452 A1* 6/2011 Kim et al. ..................... 358/1.13

FOREIGN PATENT DOCUMENTS

| JP | 11-053583 A | 2/1999 |
| JP | 2005-115500 A | 4/2005 |
| JP | 2006-318102 A | 11/2006 |
| JP | 2008-269310 A | 11/2008 |
| JP | 2010-238096 A | 10/2010 |
| WO | 2004/048895 A1 | 6/2004 |

OTHER PUBLICATIONS

Haruyoshi Yamamoto et al., "Expansion Area of Outdoor Mixed Reality—Utilization of Surveillance Cameras of Different Properties-", IEICE Technical Report, Japan, The Institute of Electronics, Information and Communication Engineers, Nov. 23, 2006, vol. 106, No. 396, pp. 23-28.
Takahiro Tsuda et al., "Evaluation of Visualization Methods for Outdoor See-Through Vision", IEICE Technical Report, Japan, The Institute of Electronics, Information and Communication Engineers, Aug. 25, 2005, vol. 105, No. 256, pp. 41-47.

* cited by examiner

Primary Examiner — Roberto Velez
Assistant Examiner — Stephen Coleman
(74) Attorney, Agent, or Firm — Sughrue Mion, PLLC

(57) ABSTRACT

An information display device may include: an image capturing unit configured to capture an image; a display unit configured to display the image captured by the image capturing unit; a detection unit configured to detect a position and an attitude of the information display device; an identification unit configured to identify a field device positioned in a direction of image capturing by the image capturing unit, by using a detection result of the detection unit; and a display control unit configured to cause an overlaid display on the display unit of the image captured by the image capturing unit, overlaid with at least one of static information and dynamic information regarding the field device identified by the identification unit.

18 Claims, 11 Drawing Sheets

INFORMATION DISPLAY DEVICE AND INFORMATION DEVICE SYSTEM

BACKGROUND OF THE INVENTION

1. Field of the Invention

The present invention relates to an information display device and an information display system.

Priority is claimed on Japanese Patent Application No. 2012-114454, filed May 18, 2012, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Conventionally, in plants, factories, and the like, in order to achieve a high level of automated operation, distributed control systems, referred to hereafter also as DCSs, in which on-site devices known as field devices, such as measuring instruments and actuators, and a control unit controlling these devices are connected via a communication unit, are implemented. In conventional distributed control systems, although communication is mostly performed by cable, in recent years wireless communication has been implemented in conformance with industrial wireless communication standards such as ISA100.11a and WirelessHART (registered trademark).

In a plant in which such a distributed control system is implemented, from the standpoint of, for example, preventing abnormal operation and maintaining measurement accuracy, workers perform periodic maintenance of the field devices. The maintenance of field devices is often performed using a portable terminal device such as a PDA (personal digital assistant) capable of close-range communication, such as by serial cable communication, infrared communication, and low-power wireless communication, and using a computer in which has been installed a field device setting tool, which is a dedicated tool for setting and adjusting field devices.

Specifically, in maintaining a field device, a worker first goes to the installation location of the field device and connects the portable terminal device to the field device using, for example, a cable. Next, the worker operates the portable terminal device to obtain device information, that is, parameters from the field device, and to display the obtained device information. Then, referring to the device information displayed on the portable terminal device, the worker, if necessary, operates the portable terminal device to change the device information and make device information setting instructions to the field device. In this manner various setting and adjustments are made to the field device.

Japanese Unexamined Patent Publication, First Publication No. 2005-115500 discloses a device that, while not used in maintaining a field device, can measure the current position and orientation of a user and can present information associated with the position and orientation. Specifically, Japanese Unexamined Patent Publication, First Publication No. 2005-115500 discloses a device that, from an image of position information marker captured by a camera, distinguishes the camera position, that is, the distance between the marker and the camera, and the angle of the camera with respect to the marker, reads the marker description and obtains information regarding the marker position, and superimposes and displays the obtained information on a camera image that is adjusted to match the camera position and angle.

In maintaining a field device, as described above, it is basically necessary to have a situation in which a worker goes to the installation location of the field device and in which reliable communication is possible between the worker's portable terminal device and the field device. For this reason, as the size of the plant or the like becomes large, the range over which the worker must travel grows large, this placing an increased burden on the worker, and requiring a long time for travel, thereby worsening the work efficiency.

From the standpoint of security, in a distributed control system, it is desirable that all of the field devices are managed in an integrated manner by the control unit. When maintaining field devices, however, as described above, because a worker can change the device information, unless workers are sufficiently trained, there is a possibility of a lowering of security, by removal, theft, loss, or the like of the portable terminal device.

In a field device, the installation location might change in accordance with the surrounding situation. For example, there might be a decrease in the communication quality of a field device capable of wireless communication (hereafter, a wireless field device) because of a change in the surrounding radio conditions. In such a case, because a worker needs to decide the location at which the wireless field device should be installed by an intuitive trial-and-error process, the work efficiency is poor, and it is not possible to make a detailed judgment of the degree of improvement in communication quality, therefore making it impossible to establish reliability.

SUMMARY

The present invention provides an information display device and an information display system enabling a reduction of the burden on a worker and an improvement in the work efficiency.

An information display device may include: an image capturing unit configured to capture an image; a display unit configured to display the image captured by the image capturing unit; a detection unit configured to detect a position and an attitude of the information display device; an identification unit configured to identify a field device positioned in a direction of image capturing by the image capturing unit, by using a detection result of the detection unit; and a display control unit configured to cause an overlaid display on the display unit of the image captured by the image capturing unit, overlaid with at least one of static information and dynamic information regarding the field device identified by the identification unit.

The static information may include identification information that is uniquely assigned to each field device. The dynamic information may include information indicating a communication condition of each of the field devices.

The information display device may further include: a storage unit configured to store position information indicating a position of the field device. The identification unit may be configured to identify the field device positioned in a direction of image capturing by the image capturing unit, by using a detection result of the detection unit and the position information stored in the storage unit.

The information display device may further include: an image processing unit configured to perform image processing with respect to the image captured by the image capturing unit and to identify a position of a graphics of the field device within the image; and an adjustment unit configured to adjust a display position of at least one of static information and dynamic information regarding the field device identified by the identification unit, so that the graphics of the field device included in the image is displayed on the display unit in correspondence to at least one of the static information and the dynamic information regarding the field device identified by the identification unit.

The information display device may further include: an image processing unit configured to perform image processing with respect to the image captured by the image capturing unit and to identify a position of a graphics of the field device within the image; and an adjustment unit configured to adjust a display position of at least one of static information and dynamic information regarding the field device identified by the identification unit, so that the graphics of the field device included in the image is displayed on the display unit in correspondence to at least one of the static information and the dynamic information regarding the field device identified by the identification unit. The storage unit may be configured to store, in addition to position information of the field device, a template image indicating the graphics of the field device. The image processing unit may be configured to identify the position of the field device included in the image, by using the template image stored in the storage unit.

An information display system may include: an information display device comprising: an image capturing unit configured to capture an image; a display unit configured to display the image captured by the image capturing unit; a detection unit configured to detect a position and an attitude of the information display device; an identification unit configured to identify a field device positioned in a direction of image capturing by the image capturing unit, by using a detection result of the detection unit; and a display control unit configured to cause an overlaid display on the display unit of the image captured by the image capturing unit, overlaid with at least one of static information and dynamic information regarding the field device identified by the identification unit; and a server device configured to supply to the information display device at least one of the static information and the dynamic information regarding the field device that is to be displayed on the information display device.

The information display device may further include: a storage unit configured to store position information indicating a position of the field device. The identification unit may be configured to identify the field device positioned in a direction of image capturing by the image capturing unit, by using a detection result of the detection unit and the position information stored in the storage unit.

The information display device may further include: an image processing unit configured to perform image processing with respect to the image captured by the image capturing unit and to identify a position of a graphics of the field device within the image; and an adjustment unit configured to adjust a display position of at least one of static information and dynamic information regarding the field device identified by the identification unit, so that the graphics of the field device included in the image is displayed on the display unit in correspondence to at least one of the static information and the dynamic information regarding the field device identified by the identification unit.

The information display device may further include: an image processing unit configured to perform image processing with respect to the image captured by the image capturing unit and to identify a position of a graphics of the field device within the image; and an adjustment unit configured to adjust a display position of at least one of static information and dynamic information regarding the field device identified by the identification unit, so that the graphics of the field device included in the image is displayed on the display unit in correspondence to at least one of the static information and the dynamic information regarding the field device identified by the identification unit. The storage unit may be configured to store, in addition to position information of the field device, a template image indicating the graphics of the field device. The image processing unit may be configured to identify the position of the field device included in the image, by using the template image stored in the storage unit.

The server device may be configured to: receive the position of the information display device, the attitude of the information display device, and an angle of view of the image capturing unit from the detection unit; identify the field device based on the position of the information display device, the attitude of the information display device, and the angle of view of the image capturing unit that have been received; read out position information, tag information, and address information of the field device, which has been identified, from a field device database; and transmit the position information, the tag information, and the address information of the field device to the identification unit of the information display device.

An information display method for displaying information regarding a field device on an information display device, may include: capturing an image; displaying the image that has been captured; detecting a position and an attitude of the information display device; identifying the field device positioned in a direction of image capturing by using a result of the detecting; and causing an overlaid display of the image that has been captured, overlaid with at least one of static information and dynamic information regarding the field device that has been identified.

The information display method may further include: storing position information indicating a position of the field device; and identifying the field device positioned in the direction of image capturing, by using the position and the attitude of the information display device that have been detected and the position information that has been stored.

The information display method may further include: performing image processing with respect to the image that has been captured and identifying a position of a graphics of the field device within the image; and adjusting a display position of at least one of static information and dynamic information regarding the field device that has been identified, so that the graphics of the field device included in the image is displayed in correspondence to at least one of the static information and the dynamic information regarding the field device that has been identified.

The information display method may further include: storing, in addition to position information of the field device, a template image indicating the graphics of the field device; and identifying a position of the field device included in the image, by using the template image that has been stored.

The information display method may further include: supplying, by a server device, to the information display device at least one of the static information and the dynamic information regarding the field device that is to be displayed on the information display device.

The information display method may further include: receiving, by the server device, the position of the information display device, the attitude of the information display device, and an angle of view of an image capturing unit; identifying, by the server device, the field device based on the position of the information display device, the attitude of the information display device, and the angle of view of the image capturing unit that have been received; reading out, by the server device, position information, tag information, and address information of the field device, which has been identified, from a field device database; and transmitting, by the server device, the position information, the tag information, and the address information of the field device to the information display device.

A computer program product embodied on a non-transitory computer readable medium, may include: instructions to capture an image; instructions to display the image that has been captured; instructions to detect a position and an attitude of an information display device; instructions to identify a field device positioned in a direction of image capturing by using a result of a detecting; and instructions to cause an overlaid display of the image that has been captured, overlaid with at least one of static information and dynamic information regarding the field device that has been identified.

The computer program product may further include: instructions to store position information indicating a position of the field device; and instructions to identify the field device positioned in the direction of image capturing, by using the position and the attitude of the information display device that have been detected and the position information that has been stored.

The computer program product may further include: instructions to perform image processing with respect to the image that has been captured and to identify a position of a graphics of the field device within the image; and instructions to adjust a display position of at least one of static information and dynamic information regarding the field device that has been identified, so that the graphics of the field device included in the image is displayed in correspondence to at least one of the static information and the dynamic information regarding the field device that has been identified.

The computer program product may further include: instructions to store, in addition to position information of the field device, a template image indicating the graphics of the field device; and instructions to identify a position of the field device included in the image, by using the template image that has been stored.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

First Preferred Embodiment

Figure 1:
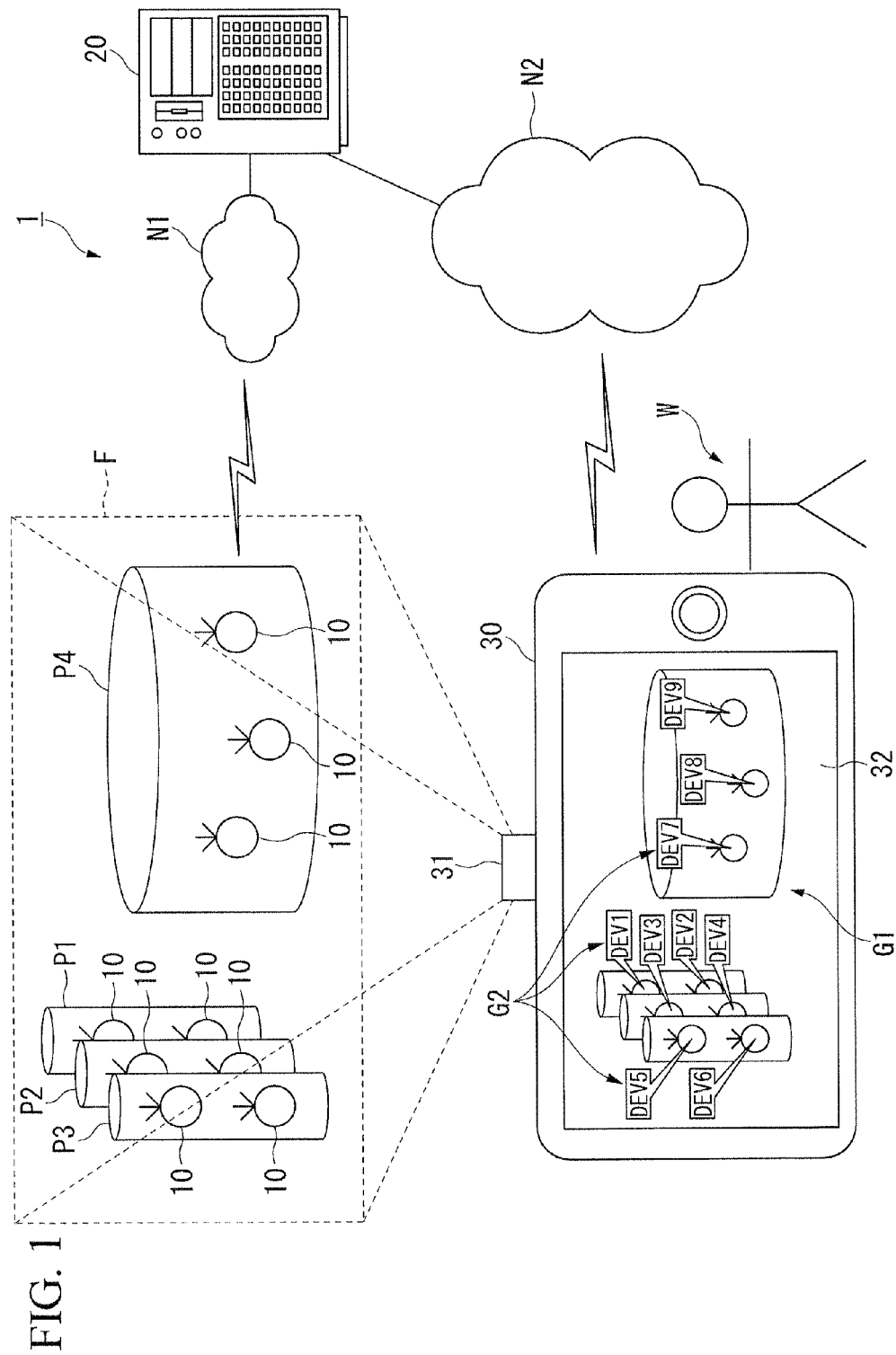
FIG. 1 is a diagram illustrating the overall constitution of an information display system in accordance with a first preferred embodiment of the present invention.

FIG. 1 is a diagram illustrating the overall constitution of an information display system in accordance with a first preferred embodiment of the present invention. As shown in FIG. 1, an information display system 1 of the first preferred embodiment has a plurality of field devices 10, a server device 20, and an information display device 30. The information display device 30 can display static information regarding the field devices 10 overlaid onto images of the field devices 10. The information display device 30 can also be used set or manage the field devices 10. In the first preferred embodiment, the above-noted static information is taken to be tag information that is uniquely allocated to each of the field devices 10. Tag information is also referred to as identification information.

In this case, the field devices 10 and the server device 20 are connected via the network N1, and the server device 20 and the information display device 30 are connected via the network N2. The network N1 is a wireless communication network capable of wireless communication conforming to an industrial wireless communication standard such as ISA100.11a or WirelessHart (registered trademark), a cable communication network such as a field bus, or a network that is a combination thereof. The network N2 is a wireless communication network capable of wireless communication conforming to a wireless communication standard such as Wi-Fi (registered trademark), 3G/LTE (registered trademark), or the like.

A field device 10 is, for example, a sensor device such as a flow amount gauge or temperature sensor, a valve device such as a flow amount control valve or open/close valve, an actuator device such as a fan or motor, or another device installed on-site in a plant. These field devices 10 communicate wirelessly, for example, in conformance with the above-described ISA100.11a or WirelessHART (registered trademark). The cylinders marked by the symbols P1 to P4 in FIG. 1 represent tanks and pipes or the like in the plant to which the field devices 10 are installed.

The server device 20 performs management that includes monitoring and control of the field devices 10 via the network N1. The server apparatus 20, in response to a request from the information display device 30, provides management information of the field devices 10 to the information display device 30, via the network N2. The server apparatus 20, in response to an instruction from the information display device 30 via the network N2, performs settings and management of the field devices 10.

The information display device 30 is operated by the worker W, and displays on a touch panel 32 an overlaid image of the image G1 captured by a camera 31 and the image G2 that indicates the tag information of the field devices 10, which is information included in the management information provided from the server device 20 via the network N2. Specifically, in the example shown in FIG. 1, the image G1 displayed on the touch panel 32 is an image within the field of view F of the camera 31 that captures an image of the field devices 10 and the facilities P1 to P4. The image G2 displayed on the touch panel 32 is an image with the characters DEV1 to DEV9 in balloons. The information display device 30, in accordance with operation by the worker W, transmits instructions for setting and management of the field device 10 to the server device 20, via the network N2. For the worker W to be able use the information display device 30, it may be made necessary to input an ID and a password.

Figure 2:
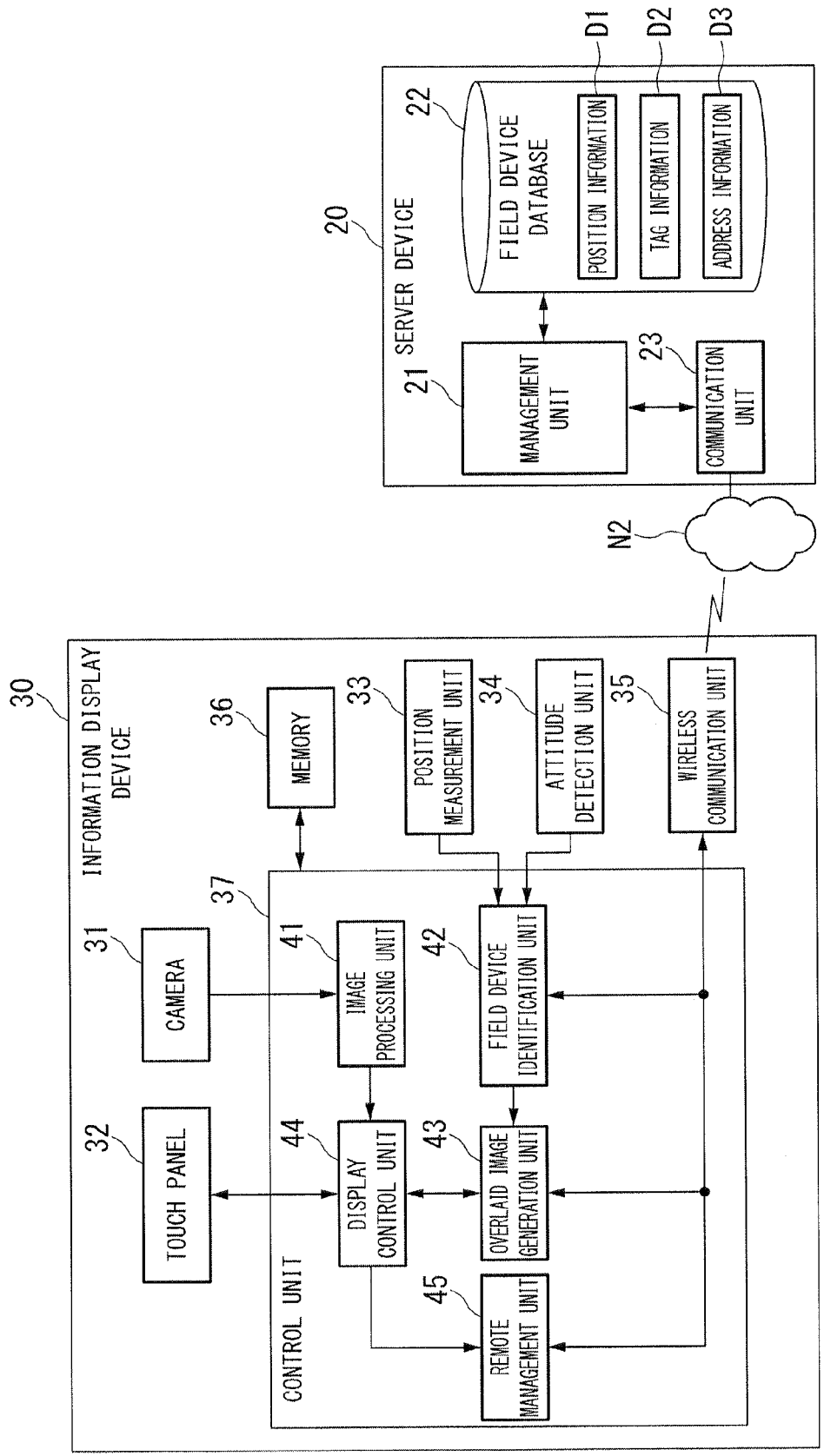
FIG. 2 is a block diagram illustrating the constitution of the main part of the server device and the information display device in accordance with the first preferred embodiment of the present invention.

FIG. 2 is a block diagram illustrating the constitution of the main part of the server device and the information display device in accordance with the first preferred embodiment of the present invention. In FIG. 2, in order to simplify the illustration, illustration of the field devices 10, the network N1, and the facilities P1 to P4 in the plant has been omitted. With regard to the server device 20 and the information display device 30, only those constituent elements necessary for the description are illustrated.

As shown in FIG. 2, the server device 20 has a management unit 21, a field device database 22, and a communication unit 23. The management unit 21, via the network N1, manages the field devices 10 and stores the management information into the field device database 22. The management unit 21, based on information transmitted from the information display device 30, the details of which will be described later, provides to the information display device 30 management information of the field devices 10 positioned within the field of view F of the camera 31 of the information display device 30.

The field device database 22 stores the management information of the field devices 10. Specifically, the field device database 22 stores position information D1 indicating the positions of the field devices 10, tag information D2, and address information (that is a URL, uniform resource locator) D3 for obtaining an instruction screen for making instructions for settings and management of the field devices 10. The communication unit 23 is connected to, and communicates via, the network N2.

The information display device 30 has a camera 31, a touch panel 32, a position measurement unit 33, an attitude detection unit 34, a wireless communication unit 35, a memory 36, and a control unit 37. The camera 31 is also called an image capturing unit. The touch panel 32 is also called a display unit. The position measurement unit 33 and the attitude detection unit 34 are also collectively called a detection unit. The memory 36 is also called a storage unit. The camera 31 has a solid-state imaging element such as a CCD (charge-coupled device), a CMOS (complementary metal oxide semiconductor), or the like, and can capture still and moving images. The touch panel 32 is an operation display device that is the combination of a display device such as a liquid crystal display device or an organic EL (electroluminescence) display device and a position input device such as a touch pad.

The position measurement unit 33 measures the position of the information display device 30. Specifically, the position measurement unit 33 receives a radio signal from a satellite used in a GPS (global positioning system) and processes the received signal to measure the position of the information display device 30. The attitude detection unit 34 has a gyro sensor, a geomagnetic sensor, or an electronic compass and the like, and detects the attitude and orientation of the information display device 30. The image capturing direction of the camera 31 can be identified from the detection results of the attitude detection unit 34.

The wireless communication unit 35 can communicate wirelessly, in conformance with a wireless communication standard, such as the previously noted Wi-Fi. (registered trademark), WiMAX (registered trademark), or 3G/LTE (registered trademark) or the like, and communicates via the network N2. The memory 36 is implemented by a storage device such as a semiconductor memory or by a storage device such as a hard disk, and stores various information used in the control unit 37.

The control unit 37 generates the image G2 indicating the tag information of the field devices 10 and, as shown in FIG. 1, displays on the touch panel 32 an image that is the image G2 laid over the image G1 captured by the camera 31. The control unit 37, in response to an operation of the touch panel 32 by the worker W, displays on the touch panel 32 an instruction screen for the purpose of setting and managing the field devices 10. The control unit 37 transmits to the server device 20 instructions according to operations with respect to the instruction screen via the network N2.

The control unit 37 has an image processing unit 41, a field device identification unit 42, an overlaid image generation unit 43, a display control unit 44, and a remote management unit 45. The field device identification unit 42 is also called an identification unit. The image processing unit 41 performs image processing such as noise removal processing and brightness adjustment processing with respect to the image captured by the camera 31. The field device identification unit 42 uses the measurement results of the position measurement unit 33 and the detection results of attitude detection unit 34 to identify field devices 10 positioned in the image capturing direction of the camera 31.

Specifically, the field device identification unit 42 transmits to the server device 20 information indicating the position of the information display device 30 measured by the position measurement unit 33, information indicating the attitude of the information display device 30 detected by the attitude detection unit 34, and information indicating the angle of view of the camera 31. Based on the device information provided from the server device 20, the field devices 10 positioned in the direction of image capturing by the camera 31 are identified.

The overlaid image generation unit 43 generates an image that is to be laid over the image G1 captured by the camera 31. Specifically, the overlaid image generation unit 43 generates an image G2 indicating the tag information of the field devices 10 identified by the field device identification unit 42. When the worker W makes an operation to identify one field device 10 captured by camera 31, the overlaid image generation unit 43 generates an image of an instruction screen for making setting and management instructions for the identified field device 10. The image of the instruction screen is generated using information obtained by the overlaid image generation unit 43 accessing addresses identified by the address information included in the management information of the field device 10 identified by the worker W.

In addition to performing control display of the touch panel 32, the display control unit 44 performs input processing via the touch panel 32. Specifically, the control display unit 44 overlays the image that is image processed by the image processing unit 41 and the image generated by the overlaid image generation unit 43 and displays the image on the touch panel 32. In response to a specific operation made by the worker W with respect to the touch panel, it outputs the instructions of the worker W to the overlaid image generation unit 43 or the remote management unit 45. The remote management unit 45 transmits to the server device 20, via the network N2, instructions in accordance with the operations made by the worker W to the instruction screen.

Figure 3:
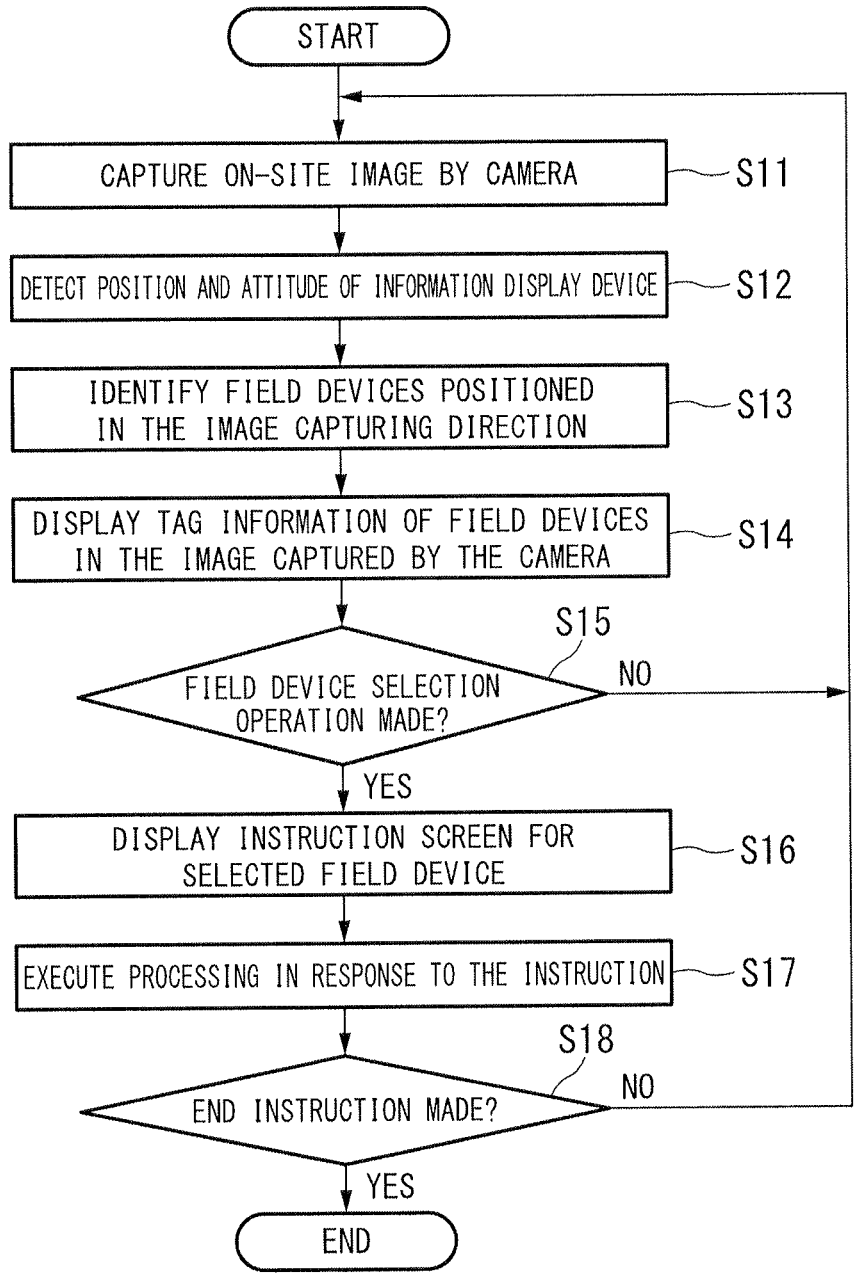
FIG. 3 is a flowchart illustrating the operation of the information display device in accordance with the first preferred embodiment of the present invention.

Next, the operation of the information display system and the information display device constituted as noted above will be described. FIG. 3 is a flowchart illustrating the operation of the information display device in accordance with the first preferred embodiment of the present invention. A normal display mode, which displays the image captured by the camera 31 as is on the touch panel 32, and overlaid display mode, which displays on the touch panel 32 the image captured by the camera 31 overlaid with an image showing tag information of the field devices 10 and the like, are provided in the information display device 30 of the first preferred embodiment. The flowchart shown in FIG. 3 starts from the worker W operating the touch panel 32 to set the operating mode of the information display device 30 to the overlaid image display mode or the like.

At step S11, when the operating mode of the information display device 30 is set to the overlaid display mode, first the camera 31 captures an image. In this case, because the information display device 30 is operated by a worker W working on-site in a plant in which the field devices 10 are installed, the camera 31 captures an on-site image. The image captured by the camera 31 is image-processed and output to the display control unit 44 by the image processing unit 41.

Next, at step S12, the position measurement unit 33 measures the position of the information display device 30, and the attitude detection unit 34 detects the attitude of the information display device 30. The measurement results of the position measurement unit 33 and the detection results of the attitude detection unit 34 are input to the field device identification unit 42 of the control unit 37 and are transmitted, via the network N2, along with information indicating the angle of view of the camera 31, from the wireless communication unit 35 to the server device 20.

Upon receiving the measurement results and the like transmitted from the information display device 30, the management unit 21 of the server device 20 identifies the field devices 10 positioned within the field of view F of the camera 31 of the information display device 30. The management information of the identified field devices 10 is then read out from the field device database 22, output to the communication unit 23, and transmitted to the information display device 30. The management information includes the position information D1, the tag information D2, and the address information D3.

The management information of the field device 10 transmitted from the server device 20 is received via the network N2 by the wireless communication unit 35 of the information display device 30, and is input to the field device identification unit 42. By doing this, because management information of the field devices 10 positioned within the field of view F of the camera 31 is obtained in the information display device 30, at step S13 the field devices 10 positioned in the image capturing direction of the camera 31 are identified.

When the field devices 10 positioned in the image capturing direction of the camera 31 are identified, the overlaid image generation unit 43 generates an image indicating the tag information of the identified field devices 10. The image indicating the tag information generated by the overlaid image generation unit 43 is output to the display control unit 44, and is displayed on the touch panel 32, laid over an image that is image-processed by the image processing unit 41. As a result, as shown in FIG. 1, at step S14, the image G1 captured by the camera 31 is displayed on the touch panel 32, overlaid with the image G2 indicating the tag information of the field devices 10.

When the above-noted processing ends, at step S15, the display control unit 44 judges whether or not a selection operation has been made by the worker W to select a field device 10 displayed on the touch panel 32. If the display control unit 44 judges that a selection operation has not been made, that is, if the judgment result at step S15 is NO, the processing of step S11 to step S14 is performed. During the time in which the judgment at step S15 is NO, the processing of steps S11 to S14 is repeated. As a result, if the worker W changes the orientation of the information display device 30, and the image G2 displayed on the touch panel 32 also changes in accordance with the change of the image captured by the camera 31, that is, the change of the image G1 displayed on the touch panel 32.

In contrast, if the display control unit 44 judges that the above-noted selection operation has been made, that is, if the judgment result at step S15 is YES, information indicating the selected field device 10 is output from the display control unit 44 to the overlaid image generation unit 43. When this occurs, the overlaid image generation unit 43 accesses the address identified by the address information D3 included in the management information of the selected field device 10 and generates an image of an instruction screen for making settings and management instructions for that field device 10. At step S16, the instruction screen image generated by the overlaid image generation unit 43 is output to the display control unit 44 and displayed on the touch panel 32.

Figure 4A:
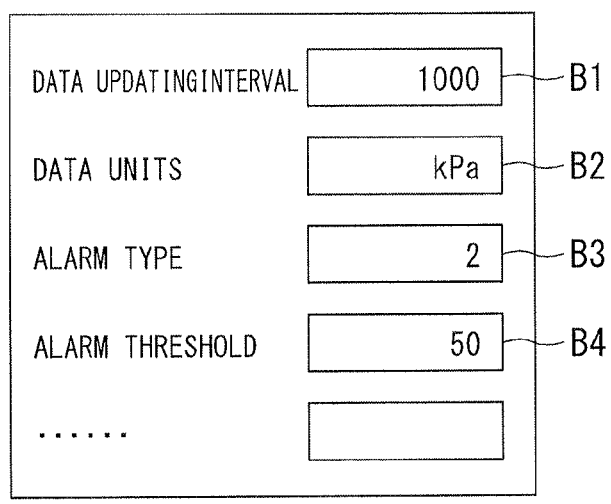
FIG. 4A and FIG. 4B are drawings illustrating an example of an instruction screen displayed in accordance with the first preferred embodiment of the present invention.
Figure 4B:
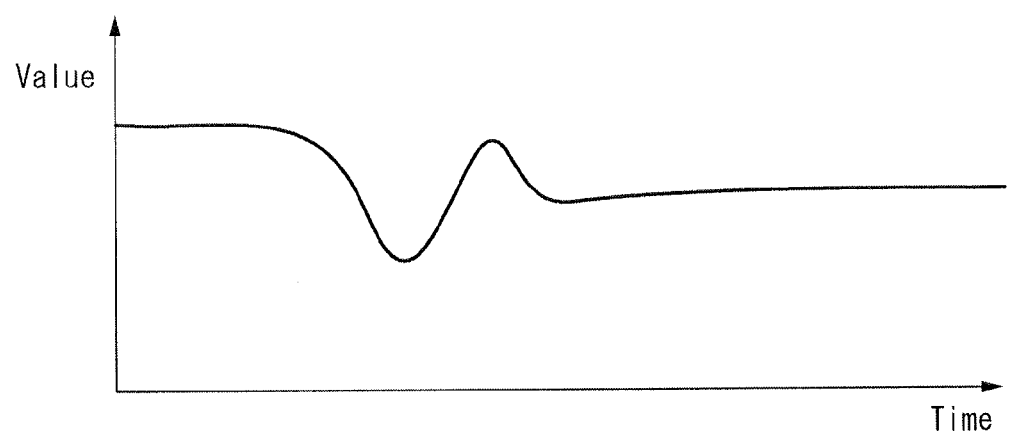

FIG. 4A and FIG. 4B are drawings illustrating an example of an instruction screen displayed in accordance with the first preferred embodiment of the present invention. The instruction screen shown in FIG. 4A is an instruction screen regarding a field device that measures a pressure, the setting items that are provided being data updating interval, data units, alarm type, alarm threshold, and the like. Input boxes B1, B2, B3, B4, and so on are provided in correspondence to each of the setting items. The input button B1 corresponds to the data updating interval, the input box B2 corresponds to the data units, the input box B3 corresponds to the alarm type, and the input button B4 corresponds to the alarm threshold. The values displayed at each of the input boxes B1 to B4 are the currently set values, and the settings of the field device 10 can be changed by changing these values. As shown in FIG. 4B, an instruction screen can be displayed which shows the time variations in the past measured values, which in this case are past measured values of pressure.

At step S17, after the instruction screen is displayed on the touch panel 32, processing in accordance with an instruction made with respect to the instruction screen is performed by the remote management unit 45. For example, if a value of the input boxes B1 to B4 shown in FIG. 4 has been changed, the remote management unit 45 performs processing to request the server device 20 to change the field device 10 setting value. Next, at step S18, a judgment is made at the display control unit 44 as to whether or not the worker W has made an instruction to end the overlaid display mode. If the judgment is that an end instruction has not been made, that is, that the judgment result at step S18 is NO, the processing from S11 is repeated, and if the end instruction has been made, that is, if the judgment result at step S18 is YES, the series of processing shown in FIG. 3 is ended.

As noted above, in the first preferred embodiment, the position of the information display device 30 is measured by the position measurement unit 33 and the attitude thereof is detected by the attitude detection unit 34, the measurement results and the detection results being used to identify field devices 10 positioned in the image capturing direction of the camera 31, and tag information for the identified field devices 10 being displayed on the touch panel 32 overlaid onto the image captured by the camera 31. If an operation is made to select a field device 10 displayed on the touch panel 32, an instruction screen for the purpose of making setting and management instructions for the selected field device 10 is displayed on the touch panel 32, enabling settings and management in response to instructions.

By doing this, a field device 10 positioned in the image capturing direction of the camera 31 can be remotely operated and the worker W can perform maintenance of the field device 10 without having to go to the installation location of the field device 10, thereby enabling a reduction of the burden on the worker W and an improvement in the work efficiency. In this case, even in a situation in which a field device 10 is hidden from the view of the worker W, if the camera 31 is sent to the installation location of the field device 10, it is possible to display the tag information of the field device 10, thereby eliminating the trouble of searching for a field device 10 that is hidden behind something, and improving the work efficiency.

As described above, the information display device 30 becomes usable after authentication by inputting an ID and a password. For this reason, because it is not necessary to install a special security key into the information display device 30, even if the information display device 30 is removed, stolen, lost, or the like, breaches of the security key cannot occur, enabling an improvement in security.

In the above-described first preferred embodiment, the description has been for an example in which the field device identification unit 42, based on field device 10 management information provided from the server device 20, identifies field devices 10 positioned in the image capturing direction of the camera 31. However, the management information stored in the field device database 22 of the server device 20 may be downloaded and stored in the memory 36 of the information display device 30 beforehand, with the management information stored in the memory 36 being used to identify field devices 10 positioned within the field of view F of the camera 31, that is, in the direction of image capturing by the camera 31.

Second Preferred Embodiment

Figure 5:
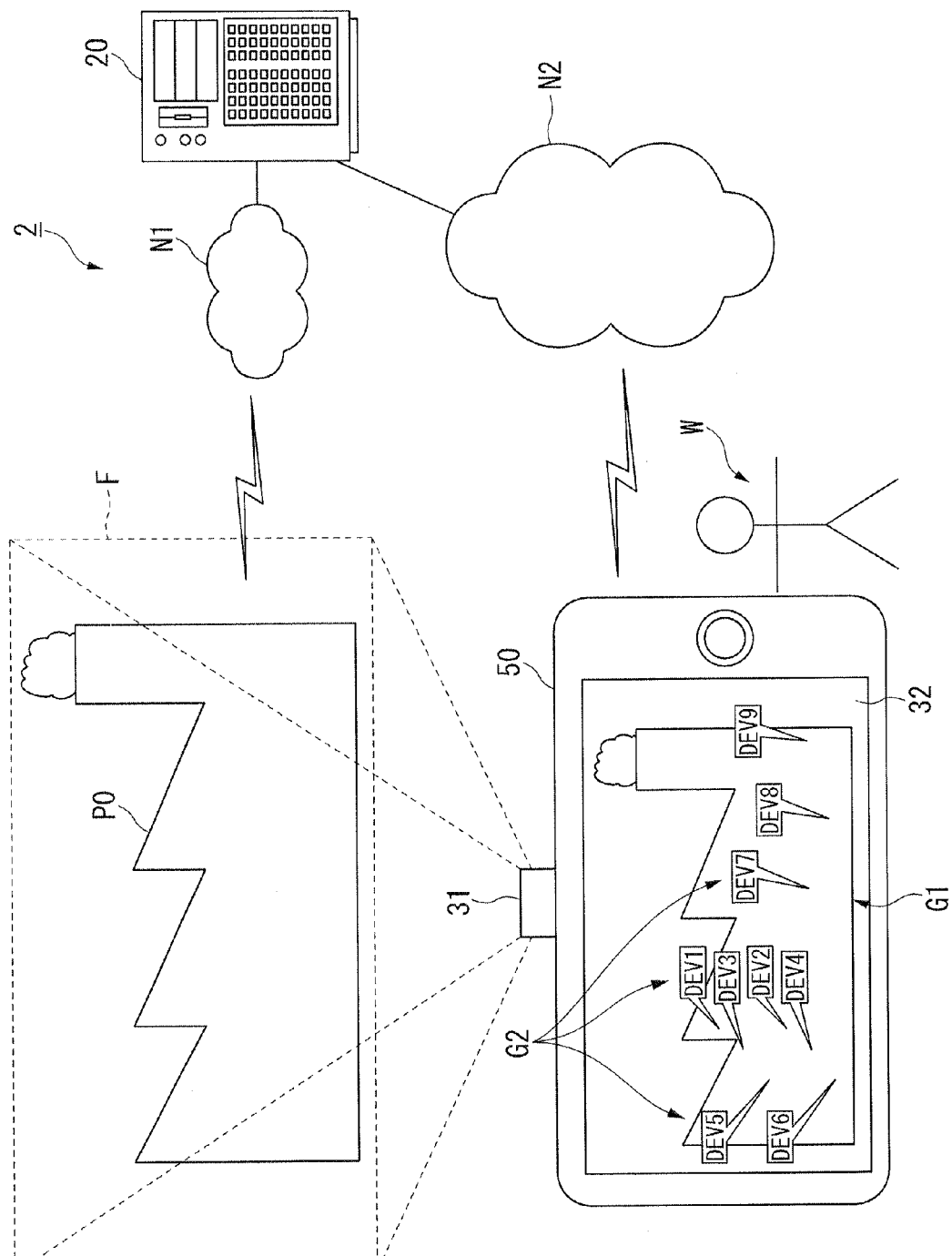
FIG. 5 is a diagram illustrating the overall constitution of an information display system in accordance with a second preferred embodiment of the present invention.
Figure 6:
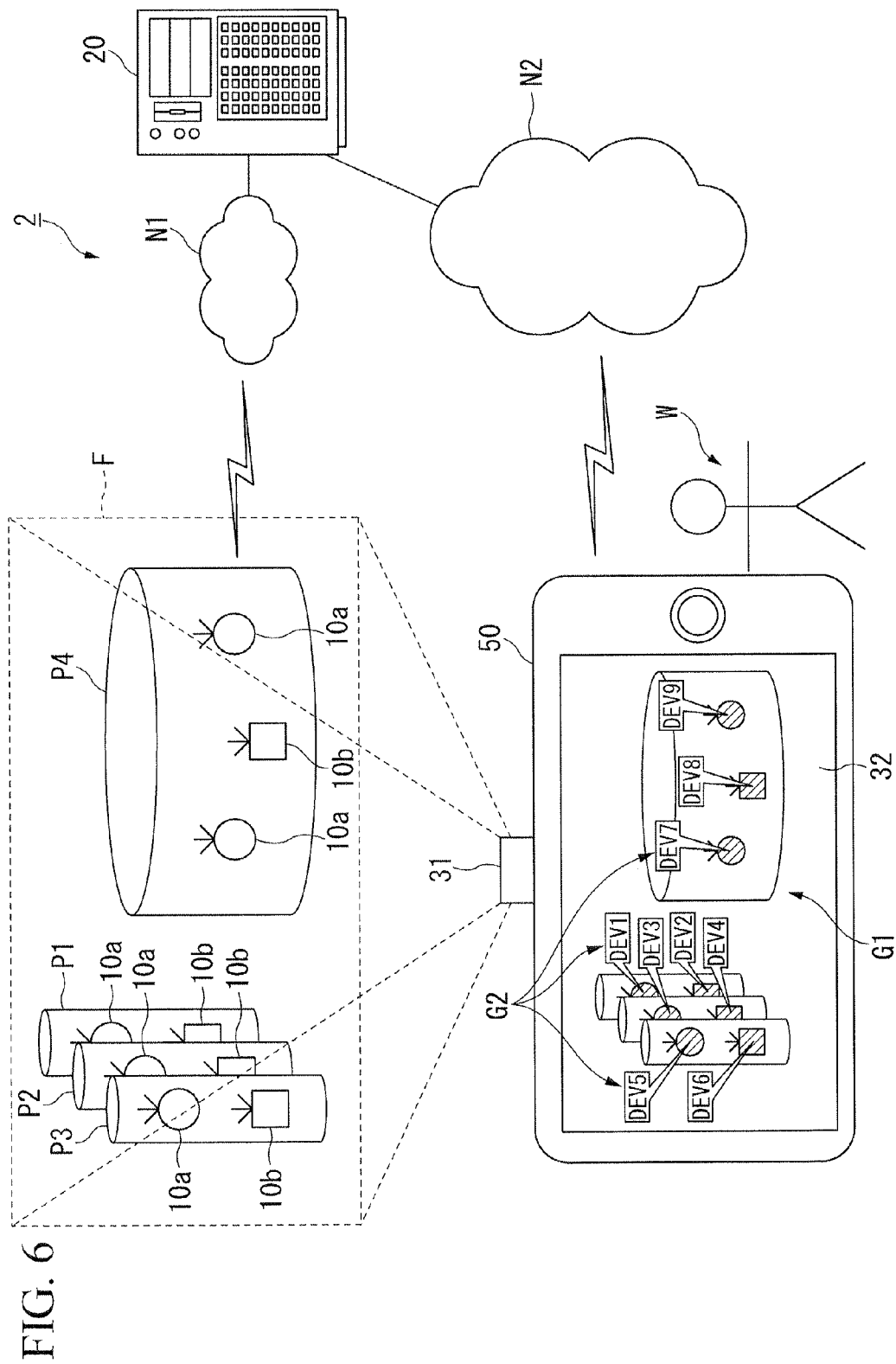
FIG. 6 is a diagram illustrating the overall constitution of an information display system in accordance with a second preferred embodiment of the present invention.

FIG. 5 and FIG. 6 are diagrams illustrating the overall constitution of an information display system in accordance with a second preferred embodiment of the present invention. In FIG. 5 and FIG. 6, constituent elements that are the same as in the constitution shown in FIG. 1 are assigned the same reference symbols. As shown in FIG. 5 and FIG. 6, the information display system 2 of the second preferred embodiment, in place of the field devices 10 shown in FIG. 1, has the field devices 10a and 10b and, in place of the information display device 30, has an information display device 50. The information display system 2 of the second preferred embodiment having this constitution, in addition to being able to display, on the information display device 50, tag information regarding the field devices 10a and 10b, with greater accuracy than in the first preferred embodiment, overlaid on the images of the field devices 10a and 10b, can perform settings and management of the field devices 10a and 10b using the information display device 50.

Because there is some degree of error in the measurement results of the position measurement unit 33 and the detection results of the attitude detection unit 34, in the above-described first preferred embodiment, there might be offset between the display positions of the field devices 10 and the tag information display positions on the touch panel 32. If such a display position offset occurs, there is a possibility that a setting might be made with respect to a field device 10 unintended by the worker W. The information display system 2 of the second preferred embodiment, by displaying the tag information regarding the field devices 10a and 10b laid over the images of the field devices 10a and 10b with more accuracy than the first preferred embodiment on the information display device 50, prevents settings and the like contrary to the intention of the worker W.

Although the field devices 10a and 10b are similar to the field devices 10 shown in FIG. 1, they are field devices having mutually differing outer appearances. For example, in contrast to the field device 10a, which is a field device provided with a circular display window, the field device 10b is a field device provided with a rectangular display window. Although, to simplify this description, the description is for the example of two field devices, 10a and 10b, having different outer appearances, there may be provided three or more field devices having different outer appearances. The building to which the reference symbol P0 is applied in FIG. 5 represents the building in which the facilities P1 to P4 in FIG. 6 are housed.

The worker W operates information display device 50, similar to the information display device 30 shown in FIG. 1. The information display device 50 displays on the touch panel 32 an overlaid image of the image G1 captured by the camera 31 and the image G2 that indicates the tag information of the field devices 10a and 10b. However, if the images of the field devices 10a and 10b are included within the image G1 captured by the camera 31, the information display device 50 adjusts the display position of the tag information so that there is correspondence in the display on the touch panel 32 between the images of the field devices 10a and 10b and the tag information of the field devices 10a and 10b.

As shown in FIG. 5, in a case such as when the worker W captures an image of the outer appearance of the building P0, if distant image capturing is done at a distance from the installation locations of the field devices 10a and 10b, the images of the field devices 10a and 10b are not included in the image G1 captured by the camera 31. In such a case, the information display device 50, by the same method as in the first preferred embodiment, makes an overlaid display on the touch panel 32 of the image G1 captured by the camera 31 and the image G2 showing the tag information of the field devices 10a and 10b.

In contrast, as shown in FIG. 6, in the case in which if the worker W captures images of the facilities P1 to P4 inside the building P0, if close image capturing is done at a position close to the installation locations of the field devices 10a and 10b, the images of the field devices 10a and 10b are included within the image G1 captured by the camera 31. In such a case, the information display device 50 adjusts the display position of the tag information so that the images of the field devices 10a and 10b included in the image G1 captured by the camera 31 and the image G2 indicating the tag information of the field devices 10a and 10b are displayed on the touch panel 32 with correspondence therebetween.

Figure 7:
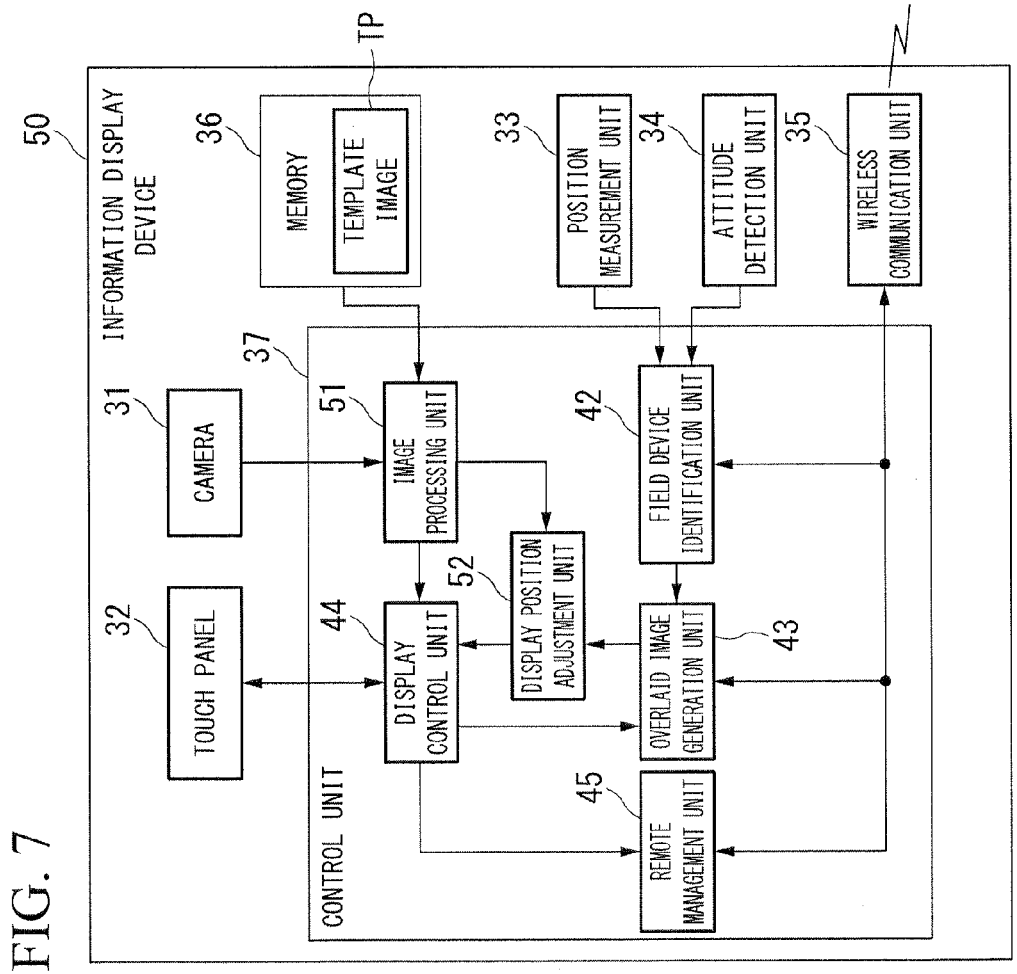
FIG. 7 is a block diagram illustrating the constitution of the main part of the server device and the information display device in accordance with the second preferred embodiment of the present invention.

FIG. 7 is a block diagram illustrating the constitution of the main part of the server device and the information display device in accordance with the second preferred embodiment of the present invention. In FIG. 7, constituent elements that are the same as in the block diagram shown in FIG. 2 are assigned the same reference symbols. To simplify this illustration, the field devices 10a and 10b shown in FIG. 5 and FIG. 6, the network N1, and the building PO and facilities P1 to P4 are not illustrated. With regard to the server device 20 and the information display device 50, only those constituent elements necessary for the description are illustrated.

As shown in FIG. 7, the information display device 50 has the camera 31, the touch panel 32, the position measurement unit 33, the attitude detection unit 34, the wireless communication unit 35, the memory 36, and the control unit 37. With regard to these points, the information display device 50 has the same constitution as the information display device 30 shown in FIG. 2. However, there is difference with respect to the information display device 30 shown in FIG. 2 in that template images TP indicating the images of the field devices 10a and 10b are stored in the memory 36, that, in the control unit 37, an image processing unit 51 is provided in place of the image processing unit 41, and that a display position adjustment unit 52 is provided anew. The display position adjustment unit 52 is also called an adjustment unit.

The template images TP stored in the memory 36 are images of the field devices 10a and 10b. The image processing unit 51 performs image processing that is similar to the image processing performed by the image processing unit 41 shown in FIG. 2. The image processing unit 51 uses the template images TP stored in the memory 36 to perform template matching processing and the like with respect to the images captured by the camera 31. By this image processing, the image processing unit 51 identifies the positions of the field devices 10a and 10b in the image captured by the camera 31.

The display position adjustment unit 52, in accordance with the positions of the images of the field devices 10a and 10b identified by image processing performed by the image processing unit 51, adjusts the display positions of the tag information generated by the overlaid image generation unit 43 on the touch panel 52. Specifically, the image display position of the tag information is adjusted so that the images of the field devices 10a and 10b included in the image GI captured by the camera 31 and the image G2 indicating the tag information of the field devices 10a and 10b are displayed on the touch panel 32 with correspondence therebetween.

Figure 8:
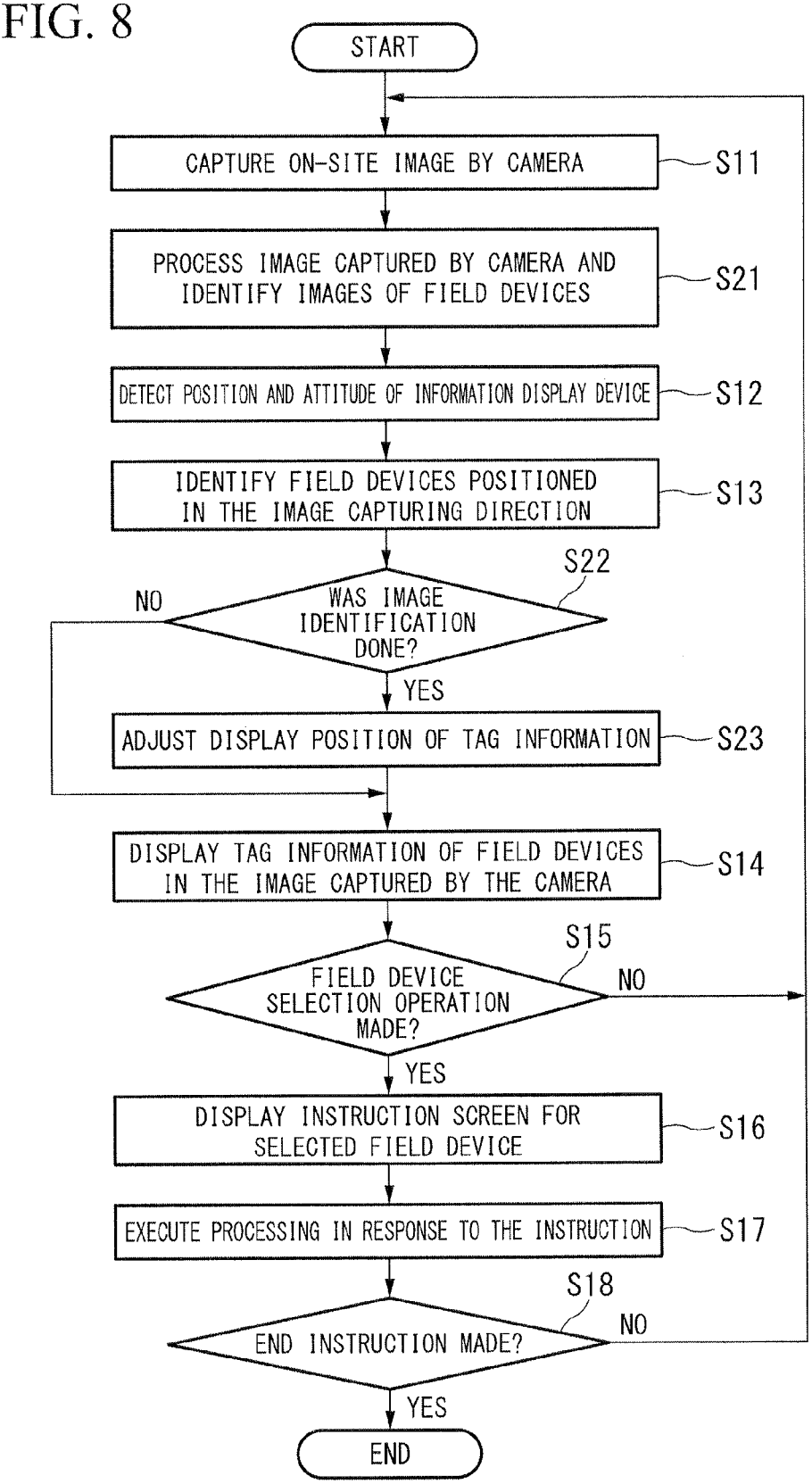
FIG. 8 is a flowchart illustrating the operation of the information display device in accordance with the second preferred embodiment of the present invention.

Next, the operation of the information display system and the information display device constituted as noted above will be described. FIG. 8 is a flowchart illustrating the operation of the information display device in accordance with the second preferred embodiment of the present invention. The flowchart shown in FIG. 8 has the processing of step S21 added between the processing of step S11 and the processing of S12 shown in FIG. 3, and the processing of steps S22 and S23 added between the processing of step S13 and the processing of step S14 shown in FIG. 3. The flowchart shown in FIG. 8, similar to the flowchart shown in FIG. 3, starts when the worker W, for example, operates the touch panel 32 to set the operating mode of the information display device 50 to the overlaid image display mode or the like.

At step S11, when the operating mode of the information display device 50 is set to the overlaid display mode, first the camera 31 captures an image. At step S21, the image captured by the camera 31 is subjected by the image processing unit 51 to the same image processing as in the first preferred embodiment, and is output to the display control unit 44. The image captured by the camera 31 is also subjected to image processing using the template images TP stored in the memory 36 in the image processing unit 51, processing being performed to identify the positions of the images of the field devices 10a and 10b in the image captured by the camera 31. Information indicating the result of this processing is output to the display position adjustment unit 52.

Next, at step S12, the position measurement unit 33 measures the position of the information display device 50 and the attitude detection unit 34 detects the attitude of the information display device 50. The measurement results of the position measurement unit 33 and the detection results of the attitude detection unit 34 are input to the field device identification unit 42 of the control unit 37 and, via the network N2, are transmitted from the wireless communication unit 35 to the server device 20, along with information indicating the angle of view of the camera 31. Then, similar to the first preferred embodiment, management information that includes position information D1 of the field devices 10a and 10b in the field of view F of the camera 31 of the information display device 50, tag information D2, and address information D3 is transmitted from the server device 20 to the information display device 50.

The management information of the field devices 10a and 10b transmitted from the server device 20 is input to the field device identification unit 42 of the information display device 50. By doing this, in the information display device 50, management information is obtained that includes the position information D1 of the field devices 10a and 10b positioned in the field of view F of the camera 31, the tag information D2, and the address information D3. At step S13, this management information is used to identify the field devices 10a and 10b positioned in the direction of image capturing by the camera 31. When the field devices 10a and 10b positioned in the direction of image capturing by the camera 31 are identified, an image showing the tag information of the identified field devices 10a and 10b is generated and output to the display position adjustment unit 52 by the overlaid image generation unit 43.

Next, at step S22, the display position adjustment unit 52 judges whether or not the positions of the image of the field devices 10a and 10b in the image captured by the camera 31 have been identified by the image processing of the image processing unit 51 at step S21. If the judgment is made that the positions of the images of the field devices 10a and 10b have been identified, that is, if the judgment result at step S22 is YES, at step S23, in accordance with the identified position of the images of the field devices 10a and 10b, the position of display of the tag information generated by the overlaid image generation unit 43 on the touch panel 32 is adjusted by the display position adjustment unit 52. However, if the judgment is made that the positions of the images of the field devices 10a and 10b have not been identified, that is, if the judgment result at step S22 is NO, the processing of step S23 is omitted.

In this case, at step S22, the case in which the judgment is made that the positions of the images of the field devices 10a and 10b have been identified, that is, the case in which the judgment result at step S22 is YES, would be a case in which, for example as shown in FIG. 6, close image capturing is done. In contrast, the case in which the judgment is made at step S22 that the positions of the images of the field devices 10a and 10b have not been identified, that is, the case in which the judgment result at step S22 is NO, would be a case in which, for example as shown in FIG. 5, distant image capturing is done.

Next, an image indicating the tag information is output from the display position adjustment unit 52 to the display control unit 44. Then, at step S14 a position-adjusted image indicating the tag information or a non-position adjusted image indicating the tag information is displayed on the touch panel 32, overlaid with the image from the image processing unit 41. That is, as shown in FIG. 6, images of the field devices 10a and 10b and the image G2 indicating the tag information of the field devices 10a and 10b are displayed on the touch panel 32 with correspondence therebetween. Alternatively, as shown in FIG. 6, the image G1 captured by the camera 31 and the image G2 indicating the tag information of the field devices 10 are simply displayed overlaid on the touch panel 32.

When the above-noted processing is completed, at step S15 the display control unit 44 performs judges whether or not a selection operation has been made by the worker W to select a field device 10 displayed on the touch panel 32. If the judgment is made that a selection operation has been not made, that is, if the judgment result at step S15 is NO, the processing of steps S11, S21, S12, S13, and S22 to S24 is performed, and if the judgment is made that a selection operation has been made, that is, if the judgment result at step S15 is YES, the processing of steps S16 to S18 is performed.

As noted above, in the second preferred embodiment, the position of the information display device 50 is measured by the position measurement unit 33 and the attitude thereof is detected by the attitude detection unit 34, the measurement results and the detection results being used to identify field devices 10 positioned in the image capturing direction of the camera 31, and the tag information for the identified field devices 10 being displayed on the touch panel 32 overlaid onto the image captured by the camera 31. When this is done, image processing is done to the image captured by the camera 31 to identify the images of the field devices 10a and 10b, and the display position of the tag information is adjusted based on the identified positions. Similar to the first preferred embodiment, if an operation is made to select a field device 10 displayed on the touch panel 32, an instruction screen for instructing settings and management of the selected field device 10 is displayed on the touch panel 32, enabling settings and management in response to instructions.

By doing this, because it is possible to remotely operate a field device 10 positioned in the direction of image capturing by the camera 31, the worker W can perform maintenance of the field device 10 without going to the installation location thereof, thereby enabling a reduction of the burden on the worker W and an improvement in work efficiency. Also, because the images of the field devices 10a and 10b and the image G2 indicating the tag information of the field devices 10a and 10b are displayed on the touch panel 32 with correspondence therebetween, settings and the like contrary to the intent of the worker W can be prevented. Additionally, similar to the first preferred embodiment, the trouble of searching for a field device 10 that is hidden behind something is eliminated, thereby improving the work efficiency. Also, the information display device 50, similar to the information display device 30 of the first preferred embodiment, becomes usable after authentication by inputting an ID and a password, thereby improving security.

Although, in the second preferred embodiment, the description has been for an example in which the template images TP of the field devices 10a and 10b are stored in the memory 36 of the information display device 50, the template images TP may be stored in the server device 20 and downloaded by the information display device 50 as necessary. By doing this, even if a field device is added that has a different outer appearance, additions and changes to the template images TP are facilitated.

In the second preferred embodiment, similar to the first preferred embodiment, the management information stored in the field device database 22 of the server device 20 may be downloaded and stored in the memory 36 of the information display device 50 beforehand. If this is done, the management information stored in the memory 36 can be used to identify field devices 10 positioned in the field of view F of the camera 31, that is, field devices 10 positioned in the direction of image capturing by the camera 31, without accessing the server device 20.

Third Preferred Embodiment

Figure 9:
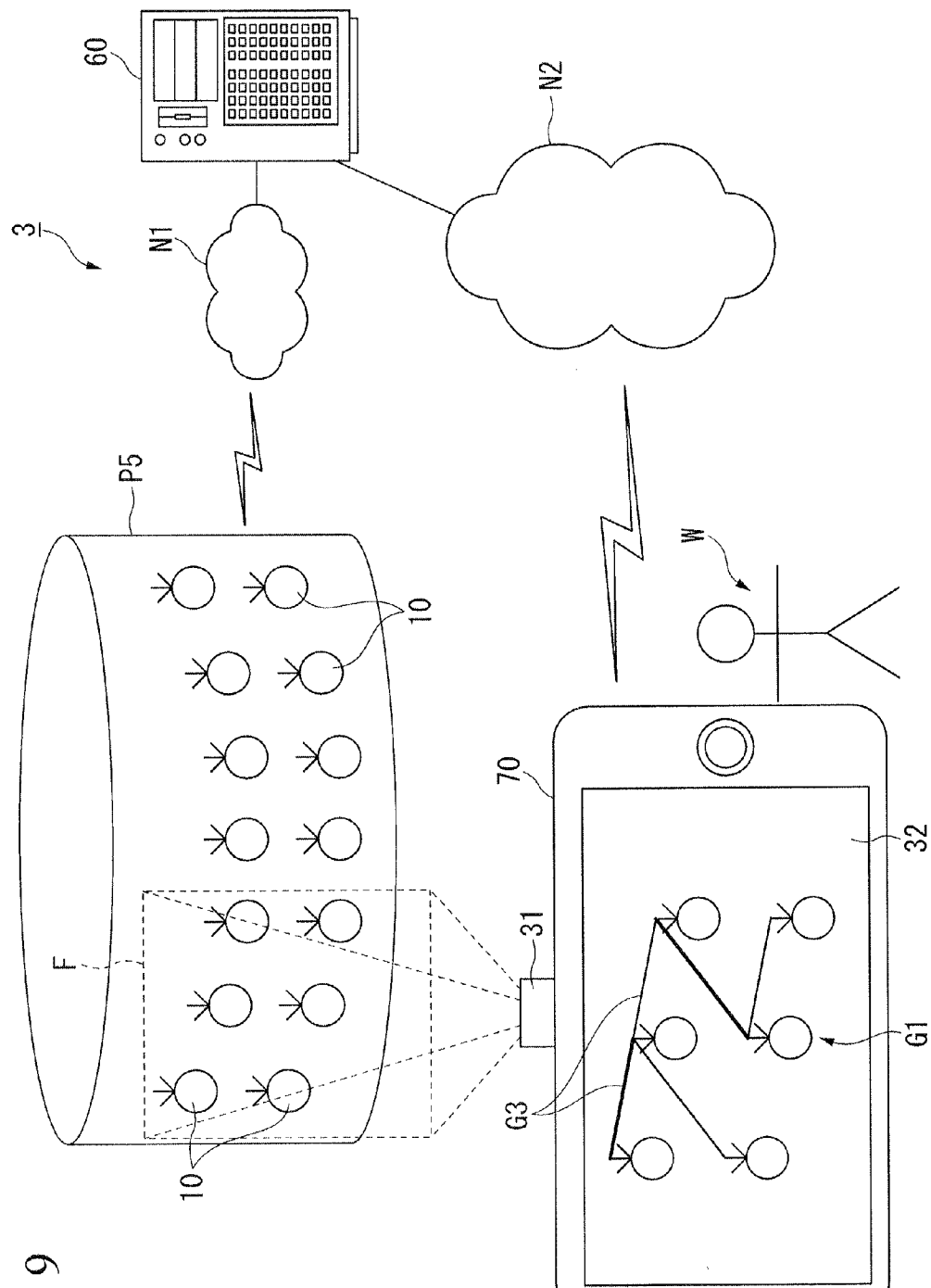
FIG. 9 is a diagram illustrating the main parts of the constitution of an information display system in accordance with the third preferred embodiment of the present invention.

FIG. 9 is a diagram illustrating the main parts of the constitution of an information display system in accordance with the third preferred embodiment of the present invention. In FIG. 9, constituent elements that are the same as those shown in FIG. 1 are assigned the same reference symbols. As shown in FIG. 9, the information display system 3 of the third preferred embodiment has a plurality of field devices 10, a server device 60 and an information display device 70, it being possible to display on the information display device 70 dynamic information regarding the field devices 10 overlaid onto an image of the field devices 10. In the third preferred embodiment, the above-noted dynamic information is information indicating the communication condition of the field devices 10. The cylinder with the reference symbol P5 in FIG. 9 represents a facility within a plant in which the field devices 10 are installed.

The server device 60, similar to the server device 20 shown in FIG. 1 and FIG. 5, performs management of the field devices 10 via the network N1 and provides management information to the information display device 70 via the network N2. In addition, the server 60 provides to the information display device 70 information indicating the communication condition of the field devices 10. In this case, the information indicating the communication condition of the field devices 10 is information such as information indicating the strength of a communication link between field devices 10, information indicating the condition of electromagnetic waves radiated from the field devices 10, information indicating the communication quality, such as the bit error rate, and information indicating the time variations of the communication condition predicted from a past history.

The information display device 70 is operated by the worker W and displays on the touch panel 32 an image of the image G1 captured by the camera 31, overlaid with an image G3 indicating information showing the communication condition of the field devices 10. Specifically, in the example shown in FIG. 9, the image G1 displayed on the touch panel 32 is an image in the field of view F of the camera 31, that is, a captured image of six of the field devices 10 of the plurality of field devices 10 provided in the facility P5, and the image G3 is an image of lines showing the connection condition between the captured field devices 10. The image G3 is displayed between field devices 10 for which communication links have been established, the thickness thereof representing the strength of the communication links. The image G3 shown in FIG. 9 is merely one example, and the image G3 displayed on the information display device 70 may be, rather than a line image, an image of arrows, or an image that represents the strength of the electromagnetic waves by contour lines.

Figure 10:
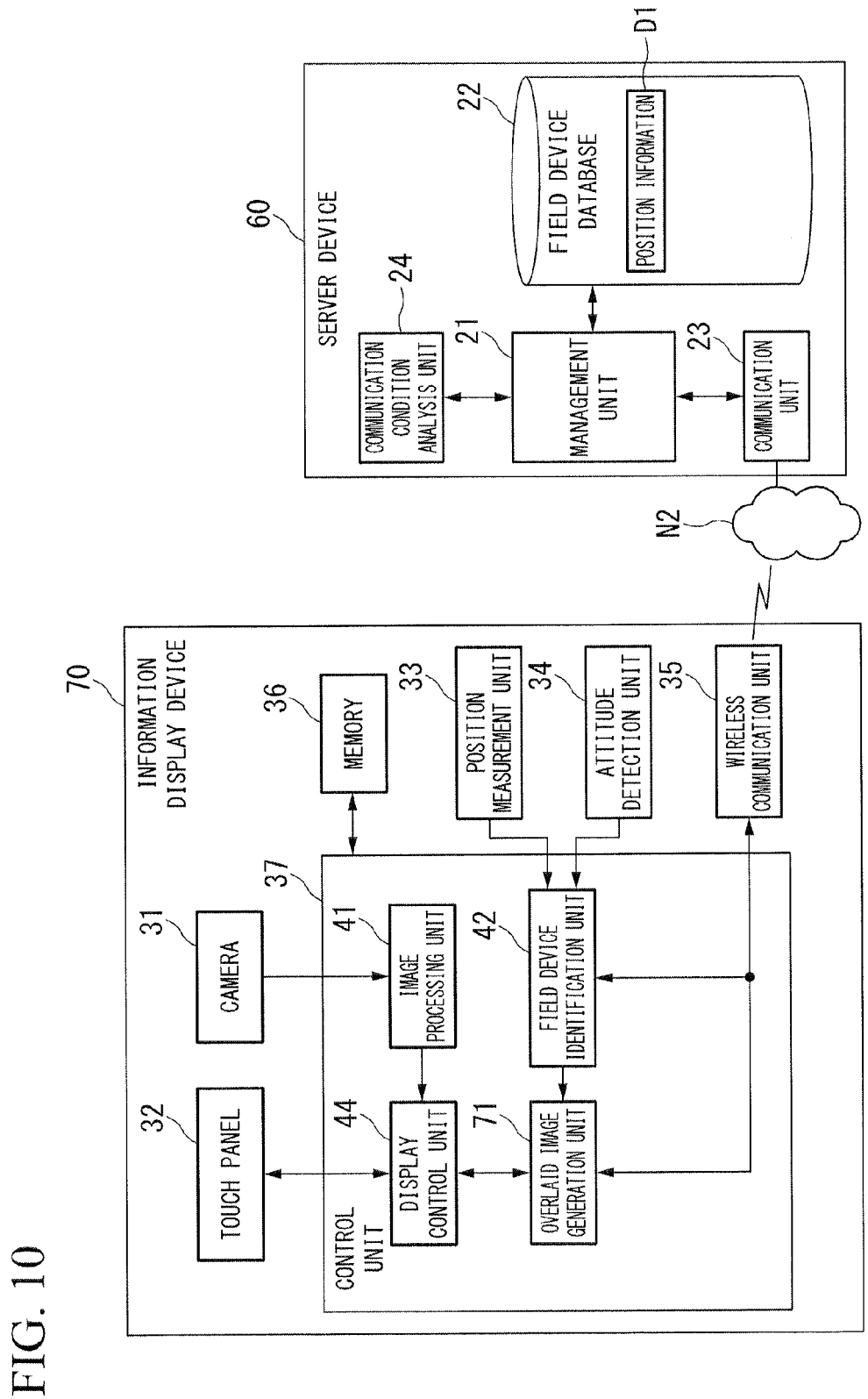
FIG. 10 is a block diagram illustrating the main constitution of the server device and the information display device in accordance with the third preferred embodiment of the present invention.

FIG. 10 is a block diagram illustrating the main constitution of the server device and the information display device in accordance with the third preferred embodiment of the present invention. In FIG. 10, blocks that are the same as in FIG. 2 are assigned the same reference symbols and, to simplify the illustration, illustrations of the field devices 10, the network N1, and the facility P5 shown in FIG. 9 are omitted.

With regard to the server device 60 and the information display device 70, only those constituent elements necessary for the description are illustrated.

As shown in FIG. 10, the server device 60, in addition to the management unit 21, the field device database 22, and the communication unit 23 of the server device 20 shown in FIG. 2, has a communication condition analysis unit 24. The communication condition analysis unit 24 uses a map and structural information of the facility P5 in which the field devices 10 are installed to perform a network simulation or an electromagnetic wave simulation and sends the results thereof to the management unit 21. By the communication condition analysis unit 24, information indicating the strength of communication links between field devices 10 or information indicating the condition of electromagnetic waves radiated from the field devices 10 or the like is obtained. Position information D1 indicating the position of the field devices 10 is stored as field device 10 management information in the field device database 22.

The information display device 70 has the camera 31, the touch panel 32, the position measurement unit 33, the attitude detection unit 34, the wireless communication unit 35, the memory 36, and the control unit 37. With regard to these points, the information display device 70 has the same constitution as the information display device 30 shown in FIG. 2. However, there is difference with respect to the information display device 30 shown in FIG. 2 in that the information display device 70 has an overlaid image generation unit 71 in place of the overlaid image generation unit 43, and in that the remote management unit 45 is eliminated. Whereas the overlaid image generation unit 43 shown in FIG. 2 generates an image G2 indicating tag information, the overlaid image generation unit 71 generates the image G3 shown in FIG. 9, in accordance with information indicating the communication condition of the field devices 10 provided from the server device 60.

Figure 11:
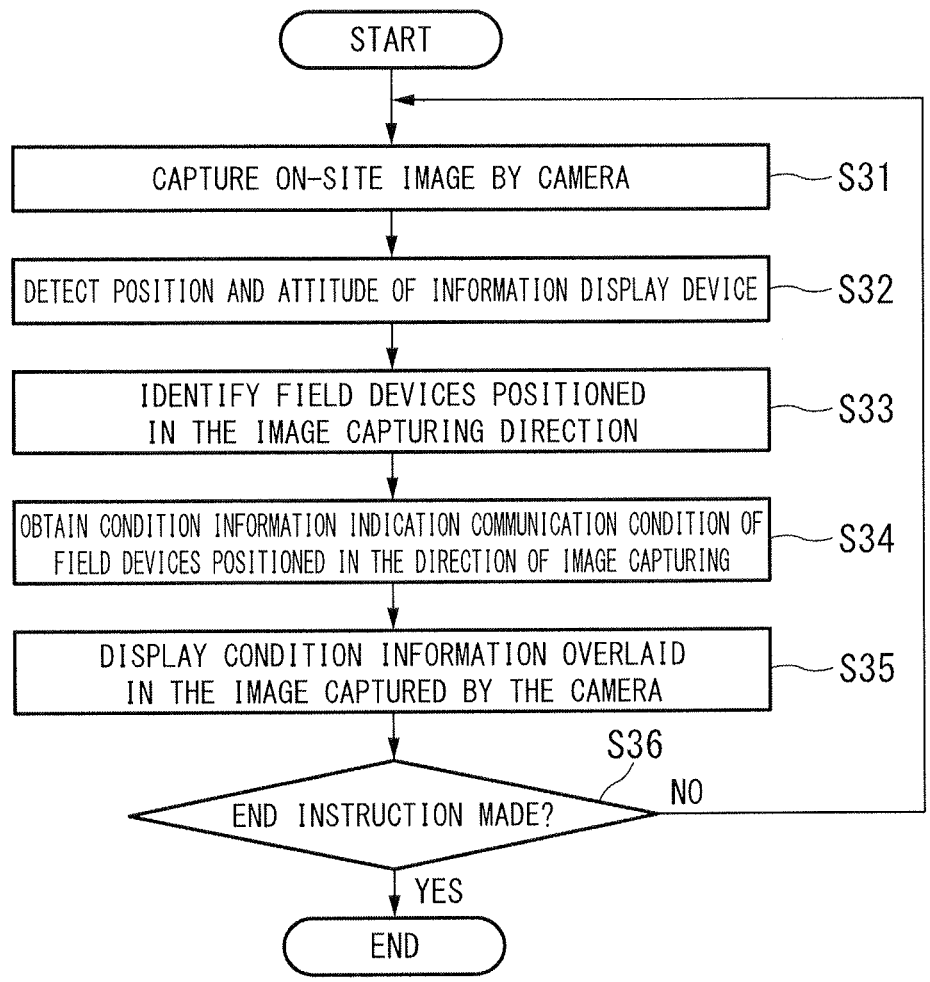
FIG. 11 is a flowchart illustrating the operation of the information display device in accordance with the third preferred embodiment of the present invention.

Next, the operation of the information display system and the information display device having the above-noted constitution will be described. FIG. 11 is a flowchart illustrating the operation of the information display device in accordance with the third preferred embodiment of the present invention. The flowchart shown in FIG. 11, similar to the flowchart shown in FIG. 3, starts when the worker W, for example, operates the touch panel 32 to set the operating mode of the information display device 70 to the overlaid image display mode or the like.

At step S31, when the operating mode of the information display device 70 is set to the overlaid display mode, first the camera 31 captures an image. In this case, because the worker W, working on-site in a plant or the like in which the field devices 10 are installed, operates the information display device 70, the on-site image is captured by the camera 31. The image captured by the camera 31 is subjected to image processing and output to the display control unit 44 by the image processing unit 41.

Next, at step S32, the position measurement unit 33 measures the position of the information display device 70, and the attitude detection unit 34 detects the attitude of the information display device 70. The measurement results of the position measurement unit 33 and the detection results of the attitude detection unit 34 are input to the field device identification unit 42 of the control unit 37 and, together with information indicating the angle of view of the camera 31, are transmitted from the wireless communication unit 35 to the server device 60, via the network N2.

Upon receiving the measurement results and the like transmitted from the information display device 70, the management unit 21 of the server device 60 identifies the field devices 10 positioned in the field of view F of the camera 31 of the information display device 70. The management unit 21 reads management information such as the position information D1 of the identified field devices 10 from the field device database 22 and outputs it to the communication unit 23, causing it to be transmitted to the information display device 70.

The field device 10 management information transmitted from the server device 60 is received at the wireless communication unit 35 of the information display device 70, via the network N2, and is input to the field device identification unit 42. By doing this, in the information display device 70, because management information such as the position information D1 of the field devices 10 positioned in the field of view F of the camera 31 is obtained, at step S33, the field devices 10 positioned in the direction of capturing of images by the camera 31 are identified.

When the field devices 10 positioned in the direction of image capturing by the camera 31 are identified, information indicating the identified field devices 10 is output from the field device identification unit 42 to the overlaid image generation unit 71, and is transmitted from the wireless communication unit 35, via the network N2, to the server device 60. Upon receiving the information from the information display device 70, the management unit 21 of the server device 60 obtains from the communication condition analysis unit 24 information indicating the communication condition of the field devices 10 identified by that information, outputting the information to the communication unit 23, causing it to be transmitted to the information display device 70.

The information indicating the communication condition of the field devices 10 that is transmitted from the server device 60 is received by the wireless communication unit 35 of the information display device 70 via the network N2, and is input to the overlaid image generation unit 71. By doing this, at step S34, information is obtained that indicates the communication condition of the field devices 10 positioned in the direction of image capturing by the camera 31. When this occurs, in the overlaid image generation unit 71, an image indicating the communication condition of the field devices 10 is generated.

At step S35, the image indicating the communication condition of the field devices 10 generated by the overlaid image generation unit 43 is output to the display control unit 44, and is displayed on the touch panel 32, overlaid with an image that is subjected to image processing by the image processing unit 41. That is, as shown in FIG. 9, the image G1 captured by the camera 31 and the information image G3 indicating the communication condition of the field devices 10 are displayed overlaid on the touch panel 32.

When the above-noted processing is completed, at step S36, a judgment is made by the display control unit 44 as to whether or not the worker W has made an instruction to end the overlaid display mode. If the end instruction has not been made, that is, if the judgment result at step S36 is NO, the processing starting at step S31 is repeated, and if end instruction has been made, that is, if the judgment result at step S36 is YES, the series of processing shown in FIG. 11 is ended.

As noted above, in the third preferred embodiment, the position of the information display device 70 is measured by the position measurement unit 33 and the attitude thereof is detected by the attitude detection unit 34, the measurement results and the detection results being used to identify the field devices 10 positioned in the direction of image capturing by the camera 31, and information indicating the communication condition of the identified field devices 10 being displayed on the touch panel 32, overlaid with the image captured by the camera 31. By doing this, because it is possible to visually verify information indicating the communication condition of field devices 10 positioned in the direction of image capturing by the camera 31, in the case, for example, in which the installation location of a field device 10 is changed, it is easy to identify a location with good radio signal conditions, thereby reducing the burden on the worker W and improving the work efficiency. Also, because it is possible to know to what degree the communication condition of a field device 10 is improved after work thereon, it is possible to achieve reliability.

The information display device 70, similar to the information display device 30 of the first preferred embodiment, becomes usable after authentication by inputting an ID and a password. As a result, because it is not necessary to install a specific security key into the information display device 70, even if the information display device 70 is removed, stolen, or lost, a breach of the security key cannot occur, thereby improving security.

In the third preferred embodiment, similar to the first preferred embodiment, management information stored in the field device database 22 of the server device 60 may be downloaded beforehand and stored in the memory 36 of the information display device 70. If this is done, it is possible, without accessing the server device 60, to use the management information stored in the memory 36 to identify the field devices 10 positioned in the field of view F of the camera 31, that is, to identify the field devices 10 positioned in the direction of image capturing by the camera 31.

The information display devices 30, 50, and 70 of the above-noted first to third preferred embodiments have a camera 31 and a touch panel 32, and are devices that are carried by the worker W. Such an information display device can be implemented by, for example, devices having cameras, such as a smart phone, a tablet terminal, or a head-mounted display.

The above-described information display systems and information display devices in accordance with the first and second preferred embodiments display on the touch panel 32 information identifying devices overlaid on an image captured by the camera 31 and remotely operate the selected devices. For this reason, they can be used for applications performing management and maintenance of equipment implementing building and home automation. An example is one in which sensors, switches, control devices and the like buried within or behind walls are remotely managed, and the remote management of devices and facilities on upper or lower floors, which are difficult to reach by radio waves. If the camera 31 and the touch panel 32 are separated, use in applications in which a robot on which the camera 31 is mounted is remotely operated by operating the touch panel 32.

The above-described information display system and information display device in accordance with the third preferred embodiment displays on the touch panel 32, overlaid onto an image captured by the camera 31, information indicating the communication condition of devices, such as information indicating the strength of a communication link, information indicating the condition of electromagnetic waves radiated from devices, information indicating communication quality, and information indicating the time variations of the communication condition predicted from a past history. For this reason, use is possible in applications in which wireless communication devices are installed a location having good communication conditions, or in applications in which the influence of electromagnetic waves radiated by medical equipment is measured.

According to a preferred embodiment of the present invention, the position and attitude of an information display device are detected by a detection unit and the detection results are used to identify a field device positioned in the direction of image capturing, a display being made on a display unit of at least one of static information and dynamic information regarding the specified field device overlaid with an image captured by an image capturing unit. By doing this, because at least one of static information and dynamic information regarding a field device required for performing work is displayed laid over an image captured by an image capturing unit, the burden on the worker is reduced and the work efficiency is improved.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and software that are constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An information display device comprising:
an image capturing unit configured to capture an image;
a display unit configured to display the image captured by the image capturing unit;
a detection unit configured to detect a position and an attitude of the information display device;
an identification unit configured to identify a field device positioned in a direction of image capturing by the image capturing unit, by using a detection result of the detection unit;
a display control unit configured to cause an overlaid display on the display unit of the image captured by the image capturing unit, overlaid with static information regarding the field device identified by the identification unit, the display control unit being configured to display on the display unit an instruction screen configured to receive instructions for changing settings for the field device if receiving a selection operation to select the field device displayed on the display unit;
a remote management unit configured to transmit a request, which changes settings for the field device, to a server device, which stores management information of the field device, based on the instructions received by the instruction screen;

an image processing unit configured to perform image processing with respect to the image captured by the image capturing unit to identify a display position of the graphics of the field device within the image; and a display position adjustment unit configured to judge whether or not the display position of the graphics of the field device within the image has been identified by the image processing of the image processing unit, and to adjust a display position of the static information within the image displayed by the display control unit based on the display position of the graphics of the field device within the image identified by the image processing unit, wherein, if it is judged that the display position of the graphics of the field device within the image has not been identified, then the display control unit causes the static information to be displayed on a display portion, which corresponds to the field device identified by the identification unit, of the overlaid display on the display unit of the image captured by the image capturing unit, and if it is judged that the display portion of the graphics of the field device within the image has been identified, then the display position adjustment unit adjusts the display portion of the static information within the image.

2. The information display device according to claim 1, wherein
the static information includes identification information that is uniquely assigned to each field device,
a dynamic information includes information indicating a communication condition of each of the field devices.

3. The information display device according to claim 1, further comprising:
a storage unit configured to store position information indicating a position of the field device, wherein
the identification unit is configured to identify the field device positioned in a direction of image capturing by the image capturing unit, by using a detection result of the detection unit and the position information stored in the storage unit.

4. The information display device according to claim 3, wherein
the storage unit is configured to store, in addition to position information of the field device, a template image indicating the graphics of the field device, and
the image processing unit is configured to identify the position of the field device included in the image, by using the template image stored in the storage unit.

5. The information display device according to claim 1, wherein
the instruction screen includes a plurality of input boxes that are provided in correspondence to each of a plurality of setting items of the field device, each of the input boxes displays a value that is a currently set value, and
the information display device is capable of changing the settings of the field device if the value displayed at each of the input boxes is changed.

6. The information display device according to claim 5, wherein
the instruction screen is capable of displaying time variations in past measured values of the field device.

7. An information display system comprising:
an information display device comprising:
an image capturing unit configured to capture an image;
a display unit configured to display the image captured by the image capturing unit;
a detection unit configured to detect a position and an attitude of the information display device;
an identification unit configured to identify a field device positioned in a direction of image capturing by the image capturing unit, by using a detection result of the detection unit;
a display control unit configured to cause an overlaid display on the display unit of the image captured by the image capturing unit, overlaid with static information regarding the field device identified by the identification unit, the display control unit being configured to display on the display unit an instruction screen configured to receive instructions for changing settings for the field device if receiving a selection operation to select the field device displayed on the display unit; and
a remote management unit configured to transmit a request, which changes settings for the field device, to a server device, which stores management information of the field device, based on the instructions received by the instruction screen,
the server device configured to supply to the information display device the static information regarding the field device that is to be displayed on the information display device,
an image processing unit configured to perform image processing with respect to the image captured by the image capturing unit to identify a display position of the graphics of the field device within the image; and
a display position adjustment unit configured to judge whether or not the display position of the graphics of the field device within the image has been identified by the image processing of the image processing unit, and to adjust a display position of the static information within the image displayed by the display control unit based on the display position of the graphics of the field device within the image identified by the image processing unit, wherein,
if it is judged that the display position of the graphics of the field device within the image has not been identified, then the display control unit causes the static information to be displayed on a display portion, which corresponds to the field device identified by the identification unit, of the overlaid display on the display unit of the image captured by the image capturing unit, and
if it is judged that the display portion of the graphics of the field device within the image has been identified, then the display position adjustment unit adjusts the display portion of the static information within the image.

8. The information display system according to claim 7, wherein the server device is configured to:
receive the position of the information display device, the attitude of the information display device, and an angle of view of the image capturing unit from the detection unit;
identify the field device based on the position of the information display device, the attitude of the information display device, and the angle of view of the image capturing unit that have been received;
read out position information, tag information, and address information of the field device, which has been identified, from a field device database; and
transmit the position information, the tag information, and the address information of the field device to the identification unit of the information display device.

9. An information display method for displaying information regarding a field device on an information display device, comprising:
    capturing an image;
    displaying the image that has been captured;
    detecting a position and an attitude of the information display device;
    identifying the field device positioned in a direction of image capturing by using a result of the detecting;
    causing an overlaid display of the image that has been captured, overlaid with static information regarding the field device that has been identified;
    displaying an instruction screen configured to receive instructions for changing settings for the field device if receiving a selection operation to select the field device that has been displayed;
    transmitting a request, which changes settings for the field device, to a server device, which stores management information of the field device, based on the instructions received by the instruction screen;
    performing image processing with respect to the image that has been captured to identify a display position of the graphics of the field device within the image;
    judging whether or not the display position of the graphics of the field device within the image has been identified by the image processing;
    adjusting a display position of the static information within the image based on the display position of the graphics of the field device within the image that has been identified;
    causing the static information to be displayed on a display portion, which corresponds to the field device that has been identified, of the overlaid display of the image that has been captured if it is judged that the display position of the graphics of the field device within the image has not been identified; and
    adjusting the display portion of the static information within the image if it is judged that the display portion of the graphics of the field device within the image has been identified.

10. The information display method according to claim 9, further comprising:
    storing position information indicating a position of the field device; and
    identifying the field device positioned in the direction of image capturing, by using the position and the attitude of the information display device that have been detected and the position information that has been stored.

11. The information display method according to claim 9, further comprising:
    storing, in addition to position information of the field device, a template image indicating the graphics of the field device; and
    identifying a position of the field device included in the image, by using the template image that has been stored.

12. The information display method according to claim 9, further comprising:
    supplying, by a server device, to the information display device the static information regarding the field device that is to be displayed on the information display device.

13. The information display method according to claim 12, further comprising:
    receiving, by the server device, the position of the information display device, the attitude of the information display device, and an angle of view of an image capturing unit;
    identifying, by the server device, the field device based on the position of the information display device, the attitude of the information display device, and the angle of view of the image capturing unit that have been received;
    reading out, by the server device, position information, tag information, and address information of the field device, which has been identified, from a field device database; and
    transmitting, by the server device, the position information, the tag information, and the address information of the field device to the information display device.

14. The information display method according to claim 9, further comprising:
    displaying a plurality of input boxes in the instruction screen that are provided in correspondence to each of a plurality of setting items of the field device, each of the input boxes displaying a value that is a currently set value; and
    changing the settings of the field device if the value displayed at each of the input boxes is changed.

15. The information display method according to claim 14, further comprising:
    displaying time variations in past measured values of the field device at the instruction screen.

16. A computer program product embodied on a non-transitory computer readable medium, the computer program product comprising:
    instructions to capture an image;
    instructions to display the image that has been captured;
    instructions to detect a position and an attitude of an information display device;
    instructions to identify a field device positioned in a direction of image capturing by using a result of a detecting;
    instructions to cause an overlaid display of the image that has been captured, overlaid with static information regarding the field device that has been identified;
    instructions to display an instruction screen configured to receive instructions for changing settings for the field device if receiving a selection operation to select the field device that has been displayed;
    instructions to transmit a request, which changes settings for the field device, to a server device, which stores management information of the field device, based on the instructions received by the instruction screen;
    instructions to perform image processing with respect to the image that has been captured to identify a display position of the graphics of the field device within the image;
    instructions to judge whether or not the display position of the graphics of the field device within the image has been identified by the image processing;
    instructions to adjust a display position of the static information within the image based on the display position of the graphics of the field device within the image that has been identified, wherein,
    instructions to cause the static information to be displayed on a display portion, which corresponds to the field device that has been identified, of the overlaid display of the image that has been captured if it is judged that the display position of the graphics of the field device within the image has not been identified; and
    instructions to adjust the display portion of the static information within the image if it is judged that the display portion of the graphics of the field device within the image has been identified.

17. The computer program product according to claim 16, further comprising:
    instructions to display a plurality of input boxes in the instruction screen that are provided in correspondence to each of a plurality of setting items of the field device;
    instructions to display a value that is a currently set value at each of the input boxes; and
    instructions to change the settings of the field device if the value displayed at each of the input boxes is changed.

18. The computer program product according to claim 17, further comprising:
    instructions to display time variations in past measured values of the field device at the instruction screen.

* * * * *